(12) United States Patent
Hall et al.

(10) Patent No.: US 9,968,102 B1
(45) Date of Patent: May 15, 2018

(54) BOWL COOLING JACKET FOR INDUSTRIAL MIXERS

(71) Applicant: SHAFFER MANUFACTURING CORPORATION, Urbana, OH (US)

(72) Inventors: Michael W. Hall, Sidney, OH (US); Kirk Lang, Powell, OH (US)

(73) Assignee: Shaffer Manufacturing Corporation, Urbana, OH (US)

( * ) Notice: Subject to any disclaimer, the term of this patent is extended or adjusted under 35 U.S.C. 154(b) by 0 days. days.

(21) Appl. No.: 15/863,366

(22) Filed: Jan. 5, 2018

Related U.S. Application Data (62) Division of application No. 14/980,804, filed on Dec. 28, 2015, now Pat. No. 9,894,904.

(60) Provisional application No. 62/258,880, filed on Nov. 23, 2015.

(51) Int. Cl.
| | |
|---|---|
| *A21C 1/00* | (2006.01) |
| *F28F 3/00* | (2006.01) |
| *A21C 1/14* | (2006.01) |
| *F28F 3/12* | (2006.01) |
| *F28D 1/06* | (2006.01) |
| *F25D 17/02* | (2006.01) |
| *F28F 9/22* | (2006.01) |
| *F28D 21/00* | (2006.01) |

(52) U.S. Cl.
CPC ............ *A21C 1/1495* (2013.01); *F28D 1/06* (2013.01); *F28F 3/12* (2013.01); *F25D 17/02* (2013.01); *F28D 2021/0042* (2013.01); *F28F 2009/226* (2013.01)

(58) Field of Classification Search
CPC . A21C 1/1495; F28D 1/06; F28D 2021/0042; F28F 3/12; F28F 2009/226; F25D 17/02
See application file for complete search history.

(56) References Cited

U.S. PATENT DOCUMENTS

| | | | | |
|---|---|---|---|---|
| 4,159,740 A | * | 7/1979 | Seiling | A21C 1/1495 165/147 |
| 8,079,749 B2 | * | 12/2011 | Kitta | A21C 1/06 366/149 |
| 8,353,621 B2 | | 1/2013 | Thomas et al. | |
| 9,894,904 B2 | | 2/2018 | Hall et al. | |

(Continued)

*Primary Examiner* — Anshu Bhatia
(74) *Attorney, Agent, or Firm* — Frost Brown Todd LLC (57) ABSTRACT

A cooling jacket for use with an industrial mixer that includes a bowl sheet, including a first horizontal rail mounted lengthwise across the top portion of the rear section of the bowl sheet; a second horizontal rail mounted lengthwise across the top portion of the front section of the bowl sheet; a plurality of vertical rails mounted on the rear section of the bowl sheet in a staggered pattern; a plurality of vertical rails mounted on the front section of the bowl sheet in a staggered pattern; a plurality of horizontal rails mounted across the bottom edge of the bowl sheet, wherein each rail is mounted between and perpendicular to certain of the vertical rails on the rear and front sections of the bowl sheet; wherein the first and second horizontal rails, vertical rails, and horizontal rails define a first coolant channel on the rear section of the bowl sheet and a second coolant channel of the front surface of the bowl sheet; and a plurality of channel covers mounted to the various vertical rails for enclosing the coolant channels.

10 Claims, 7 Drawing Sheets

FRONT OF BOWL (56) References Cited

U.S. PATENT DOCUMENTS

2011/0075509 A1* 3/2011 Hall ............... A21C 1/1495
366/149

* cited by examiner

FIG. 2
(Rear of Bowl)

FIG. 7C
(Rear View)

FIG. 7D
(Front View)

BOWL COOLING JACKET FOR INDUSTRIAL MIXERS

CROSS-REFERENCE TO RELATED APPLICATIONS

This patent application is a divisional of U.S. patent application Ser. No. 14/980,804, filed on Dec. 28, 2015 and entitled "Bowl Cooling Jacket for Industrial Mixers", which claimed the benefit of U.S. Provisional Patent Application Ser. No. 62/258,880 filed on Nov. 23, 2015 and entitled "Bowl Cooling Jacket for Industrial Mixer", the disclosures of which are hereby incorporated by reference herein in their entirety and made part of the present U.S. utility patent application for all purposes.

BACKGROUND OF THE INVENTION

The described invention relates in general to a system and apparatus for mixing viscous substances such as dough, and more specifically to a cooling jacket incorporated into and/or used in combination with the mixing bowl component of industrial mixers for controlling the temperature of the substance being mixed during the mixing process.

Friction and viscous shear encountered during mixing typically causes a temperature rise in a substance being mixed. This temperature rise becomes more severe as mixing speed increases and can adversely affect production by making the substance sticky and difficult to process. Accordingly, mixers, particularly dough mixers, are most effective when equipped with some type of temperature control means, whereby the temperature of the substance to be mixed may be stabilized at a predetermined level or maintained below a predetermined threshold. For example, bread dough should be mixed at a temperature of about 78-80° F. A known means for controlling the temperature of a substance being mixed is through the use of a refrigeration jacket attached to the mixing bowl component of a mixer. Bowl refrigeration jackets, also referred to as "cooling jackets" usually include multiple coolant channels that are arranged perpendicular to the ends of a mixing bowl, and which are arrayed around the profile of the mixing bowl. Additional coolant channels may be optionally included on the ends of the mixing bowl.

Large commercial scale dough mixers may be manufactured both with and without mixing bowl cooling jackets based primarily on the type and quantity of dough to be mixed. Dough mixers manufactured with bowl cooling jackets are categorized as having either "indirect" or "direct" cooling. An indirect refrigeration system utilizes cold water, glycol, or brine as a cooling fluid/coolant. This cooling fluid is first chilled by a compressed refrigerant system separate from the mixer, and is then pumped to the mixer. The cooling fluid then circulates through the cooling jacket of the mixing bowl, which typically includes a series of parallel channels fastened directly to the exterior of the mixing bowl. Heat generated during the mixing process is transferred from the dough, through the material of the mixing bowl, and then into the cooling fluid. The glycol coolant flows continuously through the cooling jacket during appropriate times during the mixing cycle. This principle may be applied to a "direct" refrigeration system, as well. A direct expansion refrigeration system introduces refrigerant directly into the refrigeration jacket of a mixer to remove excess heat from the dough being mixed. This type of cooling system typically includes a compressor, a condenser, an evaporator, and a receiver. The bowl refrigeration jacket serves as the evaporator in this configuration and the types of refrigerants used in this configuration typically include R134a and MP-39.

With regard to the commercial mixing systems, during a typical mixing cycle, doughs or other viscous materials approaching 3000 pounds are mixed at speeds approaching 100 rpm. The movement of the material being mixed within the mixing bowl creates tremendous force, which is directed outward in a direction perpendicular to the orientation of the bowl sheet component of a mixing bowl. As a reaction to these forces, the bowl sheet will repeatedly expand and contract, temporarily altering the profile of the bowl sheet. Known systems utilize heavily reinforced bowl cooling jackets to overcome this bowl sheet deflection. Because cooling jackets are usually rigidly attached to the bowl sheet components of mixers to provide sealed channels for coolant passage, the welded points of attachment between channels of the cooling jacket and the bowl sheet are subjected to cyclical stress concentrations. Over time, these stress concentrations result in fatigue at the attachment points and ultimately in the failure of the cooling jacket. Thus, there was a need for a bowl refrigeration or cooling jacket, the design of which would reduce the stress and fatigue experienced at the welded points of attachment between the channels of a cooling jacket and the bowl sheet to which it was attached.

A cooling jacket for use with mixing bowls typically incorporated into industrial mixers is described in U.S. Pat. No. 8,353,621. This cooling jacket addressed the above-referenced technical deficiencies and includes plurality of substantially parallel coolant channels formed from the material of the jacket, wherein each of the plurality of channels further includes a least one vertical portion and at least one horizontal portion, and wherein each horizontal portion further includes a plurality of parallel ridges and parallel valleys formed therein and running lengthwise therethrough. While effective for its intended purpose, this cooling jacket was found to have than higher than acceptable failure rates, with a certain percentage of failures occurring in various welded joints such as weld seams where one channel was welded to another channel, weld seams where a channel was welded to a side rail, welds seams where two side rails were joined, and return channel side rails between the cooling jacket. It was, therefore, determined that this refrigeration jacket design did not enable the creation of consistent, quality welded joints. Accordingly, there is an ongoing need for a cooling jacket for use with mixing bowls that provides the ability to produce consistent, quality welded joints.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a cooling jacket for use with an industrial mixer that includes a bowl sheet as a component thereof is provided. The bowl sheet includes an internal surface that defines a cavity for receiving material to be mixed and an external surface having a front section and a rear section, wherein the front section further includes a top portion and a bottom portion, and wherein the rear section further includes a top portion and a bottom portion. The cooling jacket includes a first horizontal rail mounted lengthwise across the top portion of the rear section of the bowl sheet; a second horizontal rail mounted lengthwise across the top portion of the front section of the bowl sheet; a plurality of vertical rails mounted on the rear section of the bowl sheet in a staggered pattern; a plurality of vertical rails mounted on the front section of the bowl sheet in a staggered pattern; a plurality of horizontal rails mounted across the bottom portions of the rear and front sections of the bowl sheet, wherein each rail in the plurality of horizontal rails is mounted between and perpendicular to certain of the vertical rails mounted on the rear section of the bowl sheet and certain of the vertical rails mounted on the front section of the bowl sheet, wherein the first and second horizontal rails, vertical rails, and horizontal rails mounted between certain of the vertical rails define a first coolant channel on the rear section of the bowl sheet and a second coolant channel of the front surface of the bowl sheet. A first plurality of channel covers is mounted to the vertical rails on the rear section of the bowl sheet and a second plurality of channel covers mounted between and to the channel covers in the first plurality of channel covers, wherein the first and second plurality of channel covers are operative to completely enclose the first coolant channel. A third plurality of channel covers mounted to the vertical rails on the front section of the bowl sheet and a fourth plurality of channel covers mounted between and to the channel covers in the third plurality of channel covers, wherein the third and fourth plurality of channel covers are operative to completely enclose the second coolant channel. A horizontal cross-channel formed on the front section of the bowl sheet above the second horizontal rail, wherein the cross-channel is operative to permit fluid coolant to flow from one side of the cooling jacket to the other side of the cooling jacket on the front section of the mixing bowl.

In accordance with another aspect of the present invention, a mixing bowl for use with mixing systems is provided. This mixing bowl includes a bowl sheet and a cooling jacket mounted on or constructed on the bowl sheet. The bowl sheet includes an internal surface that defines a cavity for receiving material to be mixed and an external surface having a front section and a rear section, wherein the front section further includes a top portion and a bottom portion, and wherein the rear section further includes a top portion and a bottom portion. The cooling jacket is mounted on the external surface of the bowl sheet, is adapted to receive fluid coolant, and includes a first horizontal rail mounted lengthwise across the top portion of the rear section of the bowl sheet; a second horizontal rail mounted lengthwise across the top portion of the front section of the bowl sheet; a plurality of vertical rails mounted on the rear section of the bowl sheet in a staggered pattern; a plurality of vertical rails mounted on the front section of the bowl sheet in a staggered pattern; a plurality of horizontal rails mounted across the bottom portions of the rear and front sections of the bowl sheet, wherein each rail in the plurality of horizontal rails is mounted between and perpendicular to certain of the vertical rails mounted on the rear section of the bowl sheet and certain of the vertical rails mounted on the front section of the bowl sheet, wherein the first and second horizontal rails, vertical rails, and horizontal rails mounted between certain of the vertical rails define a first coolant channel on the rear section of the bowl sheet and a second coolant channel of the front surface of the bowl sheet, wherein the first coolant channel is in fluid communication with the second coolant channel for permitting fluid coolant on the rear section of the bowl sheet to cross from the rear section of the bowl sheet to the front section of the bowl sheet; a first plurality of channel covers mounted to the vertical rails on the rear section of the bowl sheet and a second plurality of channel covers mounted between and to the channel covers in the first plurality of channel covers, wherein the first and second plurality of channel covers are operative to completely enclose the first coolant channel; a third plurality of channel covers mounted to the vertical rails on the front section of the bowl sheet and a fourth plurality of channel covers mounted between and to the channel covers in the third plurality of channel covers, wherein the third and fourth plurality of channel covers are operative to completely enclose the second coolant channel; and a horizontal cross-channel formed on the front section of bowl sheet above the second horizontal rail, wherein the cross-channel is operative to permit fluid coolant to flow from one side of the cooling jacket to the other side of the cooling jacket on the front section of the mixing bowl.

In yet another aspect of this invention, a mixing bowl for use with industrial mixers is provided. This mixing bowl also includes a bowl sheet and a cooling jacket mounted on or constructed on the bowl sheet. The bowl sheet includes an internal surface that defines a cavity for receiving material to be mixed and an external surface having a front section and a rear section, wherein the front section further includes a top portion and a bottom portion, and wherein the rear section further includes a top portion and a bottom portion. The cooling jacket is mounted on the external surface of the bowl sheet, is adapted to receive fluid coolant, and includes a first horizontal rail mounted lengthwise across the top portion of the rear section of the bowl sheet; a second horizontal rail mounted lengthwise across the top portion of the front section of the bowl sheet; a plurality of vertical rails mounted on the rear section of the bowl sheet in a staggered pattern; a plurality of vertical rails mounted on the front section of the bowl sheet in a staggered pattern; a plurality of horizontal rails mounted across the bottom portions of the rear and front sections of the bowl sheet, wherein each rail in the plurality of horizontal rails is mounted between and perpendicular to certain of the vertical rails mounted on the rear section of the bowl sheet and certain of the vertical rails mounted on the front section of the bowl sheet, wherein the first and second horizontal rails, vertical rails, and horizontal rails mounted between certain of the vertical rails define a first coolant channel on the rear section of the bowl sheet and a second coolant channel of the front surface of the bowl sheet, wherein the first coolant channel is in fluid communication with the second coolant channel for permitting fluid coolant on the rear section of the bowl sheet to cross from the rear section of the bowl sheet to the front section of the bowl sheet; a first plurality of channel covers mounted to the vertical rails on the rear section of the bowl sheet and a second plurality of channel covers mounted between and to the channel covers in the first plurality of channel covers, wherein the first and second plurality of channel covers are operative to completely enclose the first coolant channel; a third plurality of channel covers mounted to the vertical rails on the front section of the bowl sheet and a fourth plurality of channel covers mounted between and to the channel covers in the third plurality of channel covers, wherein the third and fourth plurality of channel covers are operative to completely enclose the second coolant channel; and a horizontal cross-channel formed on the front section of bowl sheet above the second horizontal rail, wherein the cross-channel is operative to permit fluid coolant to flow from one side of the cooling jacket to the other side of the cooling jacket on the front section of the mixing bowl.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention provides a metal (e.g., steel) cooling or refrigeration jacket for use with large scale industrial mixers. The design and construction of the cooling jacket provides for the production of consistent, quality welded joints between the surface of the mixing bowl and the vertical rails that are welded to the surface of the mixing bowl, as well as between the vertical rails and the horizontal covers that are welded to the vertical rails and to each other. This cooling jacket also reduces stresses that exist in the weld joints of prior art cooling jackets (see above) by at least 30%, maintains and/or improves the heat transfer rate of prior art cooling jackets, and reduces the coolant pressure drop experienced by prior art cooling jackets. The cooling or refrigeration jacket of the present invention is typically referred to as a "vertical split lap jacket".

Figure 1A:
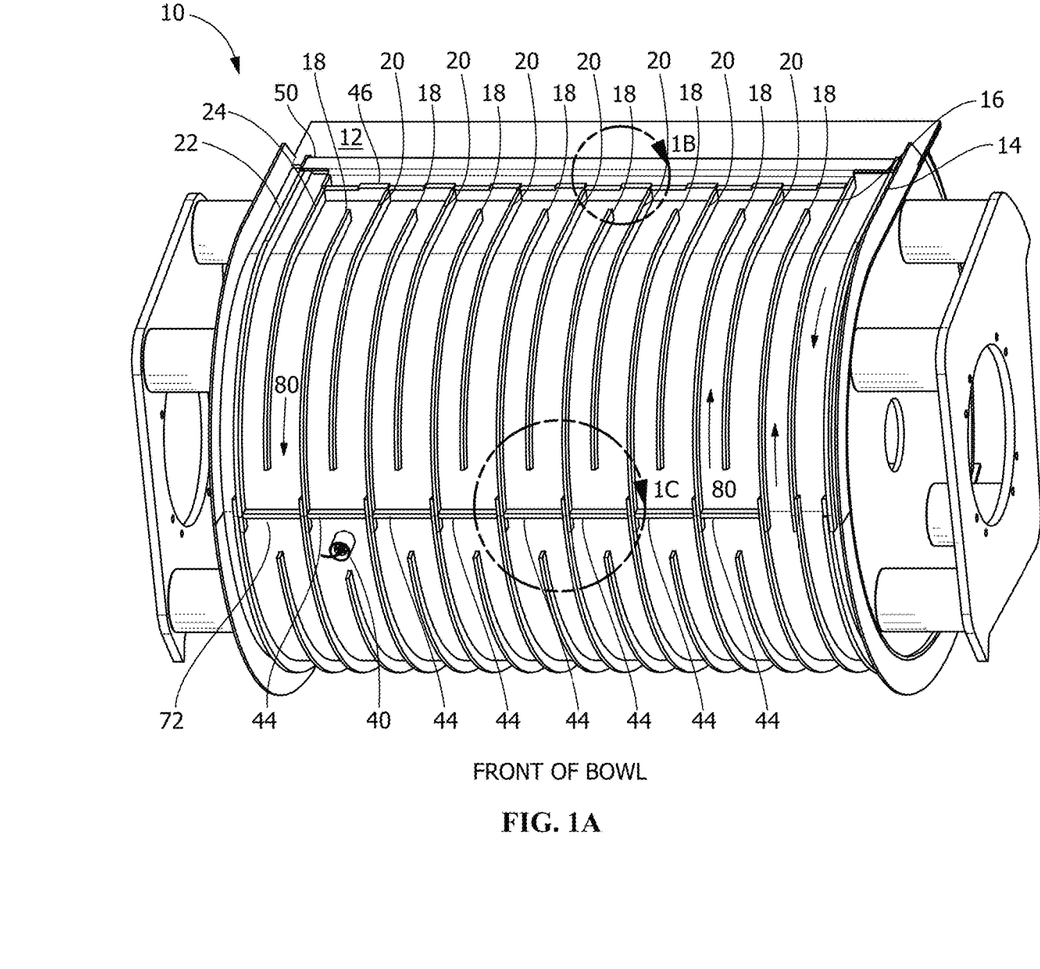
FIG. 1A is a bottom, front perspective view of a cooling jacket for use in industrial mixers, in accordance with an exemplary embodiment of the present invention, wherein the covers have been removed from the channels of the cooling jacket.
Figure 1B:
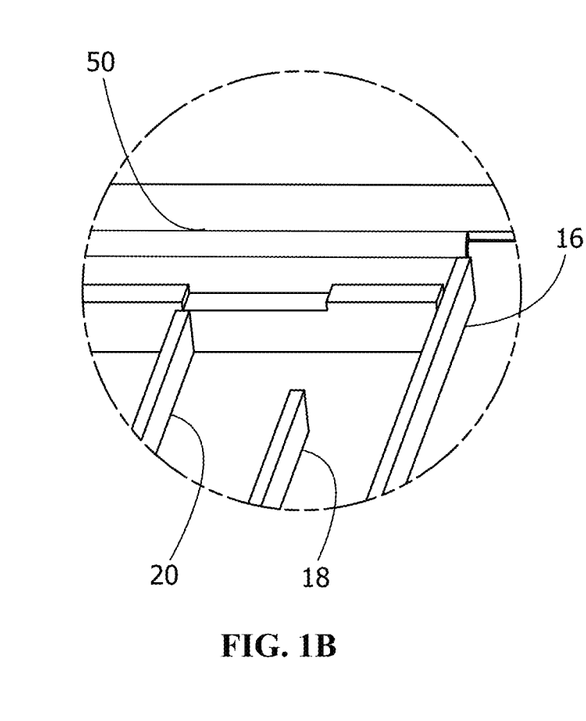
FIG. 1B is a detail of the cooling jacket of FIG. 1A showing the appearance of the top portion of the channels, front top and bottom return rails, and the front cross channel of the cooling jacket.
Figure 1C:
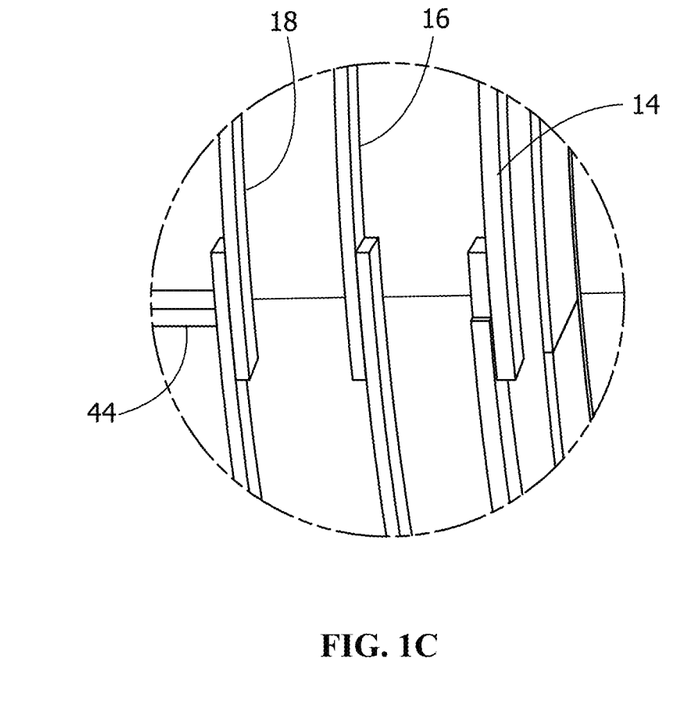
FIG. 1C is a detail of the cooling jacket of FIG. 1A showing the vertical bars bottom joint, wherein the center rail has been partially removed to reveal the seam between the front and rear portions of the bowl sheet.
Figure 2:
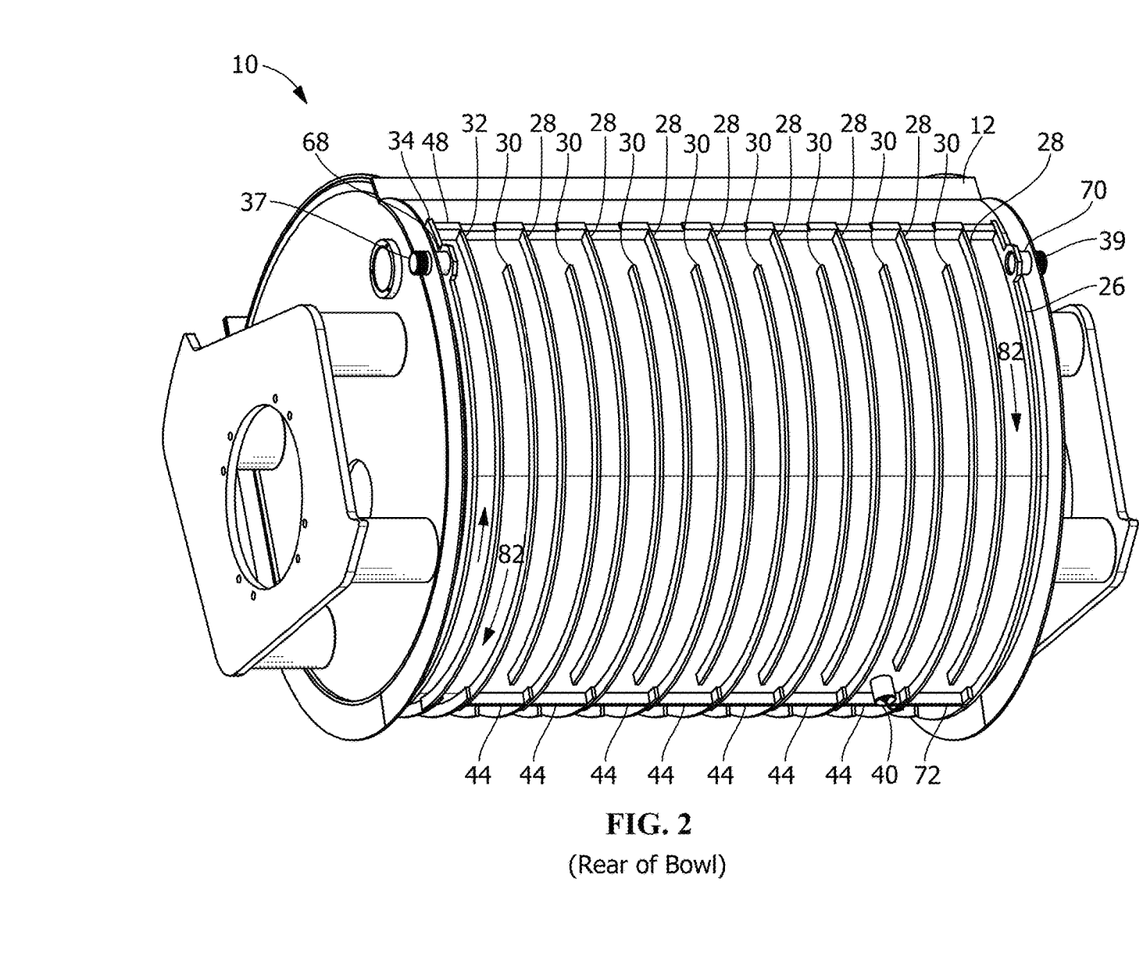
FIG. 2 is a bottom, rear perspective view of the cooling jacket of FIG. 1A, wherein the covers have been removed from the channels of the cooling jacket.

With reference to the Figures, FIG. 1A provides a bottom, front perspective view of an exemplary bowl cooling jacket assembly or "bowl cooling jacket" 10, which is intended for use in commercial and industrial mixers. In FIG. 1A, cooling jacket 10 is mounted on, attached to, or otherwise constructed on surface 12 of a mixing bowl (using know welding techniques), which may be referred to as a "bowl sheet". The various channel covers have been removed from (or not yet installed on) the vertical rails of cooling jacket 10. FIG. 1A further illustrates the placement of the following structures relative to one another on bowl sheet 12: front, right-hand-side rail 14; front right-hand-side return rail 16; front top return rail 18 (quantity of 8); front bottom return rail 20 (quantity of 7); front, left-hand-side rail 22; front left-hand-side return rail 24; dough temperature probe assembly 40; center divider rail 44 (quantity of 7); front cross channel 50; end divider rail 72; and front coolant channels 80. FIG. 1B is a detail of cooling jacket 10 showing the appearance of the top portion of coolant channels 80; front right-hand-side return rail 16; front top return rails 18; front bottom return rail 20; and front cross channel 50. FIG. 1C is a detail of the cooling jacket of FIG. 1A showing the vertical bars bottom joint, as well as front, right-hand-side rail 14; front right-hand-side return rail 16 front top return rail 18; center divider rail 44; and continuous front coolant channel 80. FIG. 2 provides a bottom, rear perspective view of cooling jacket 10, again wherein the various channel covers have been removed from (or not yet installed on) the vertical rails of cooling jacket 10. FIG. 2 further illustrates the placement of the following structures relative to one another on bowl sheet 12: rear left-hand-side rail 26; rear bottom return rail 28 (quantity of 8); rear top return rail 30 (quantity of 8); rear return rail 32; rear right-hand-side rail 34; coolant outlet 37; coolant inlet 39; dough temperature probe assembly 40; center divider rail 44 (quantity of 7); rear cap rail 48; outlet pipe nipple 68; inlet pipe nipple 70; end divider rail 72; and continuous rear coolant channel 82.

Figure 3A:
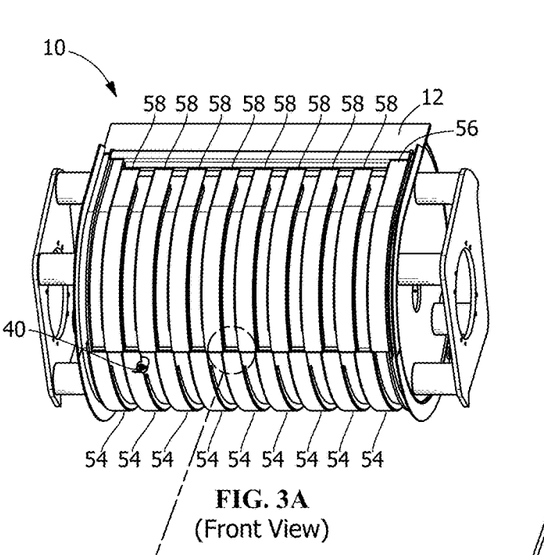
FIG. 3A is a bottom, front perspective view of the cooling jacket of FIG. 1A, wherein the front wide covers and rear wide covers have been installed on the channels of the cooling jacket.
Figure 3B:
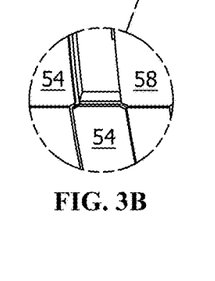
FIG. 3B is a detail of the cooling jacket of FIG. 3A more closely showing the positional relationship between the front wide covers and one of the rear wide covers.
Figures 4A, 4C:
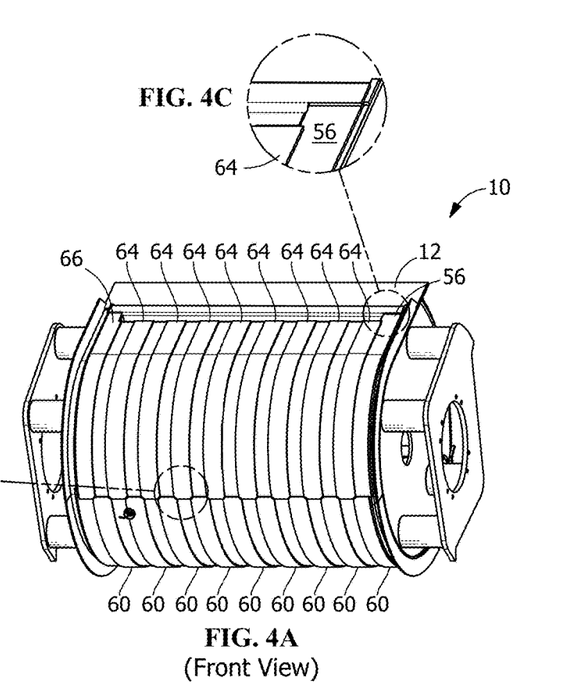
FIG. 4A is a bottom, front perspective view of the cooling jacket of FIG. 3A, wherein the front narrow covers and rear narrow covers have been installed on the channels of the cooling jacket.
FIG. 4C is a detail of the cooling jacket of FIG. 4A more closely showing the appearance of the front right-hand-side cover.
Figure 4B:
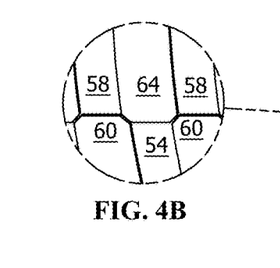
FIG. 4B is a detail of the cooling jacket of FIG. 4A, more closely showing the positional relationship between the front wide covers, front narrow covers, rear wide covers, and rear narrow covers.
Figures 5, 6:
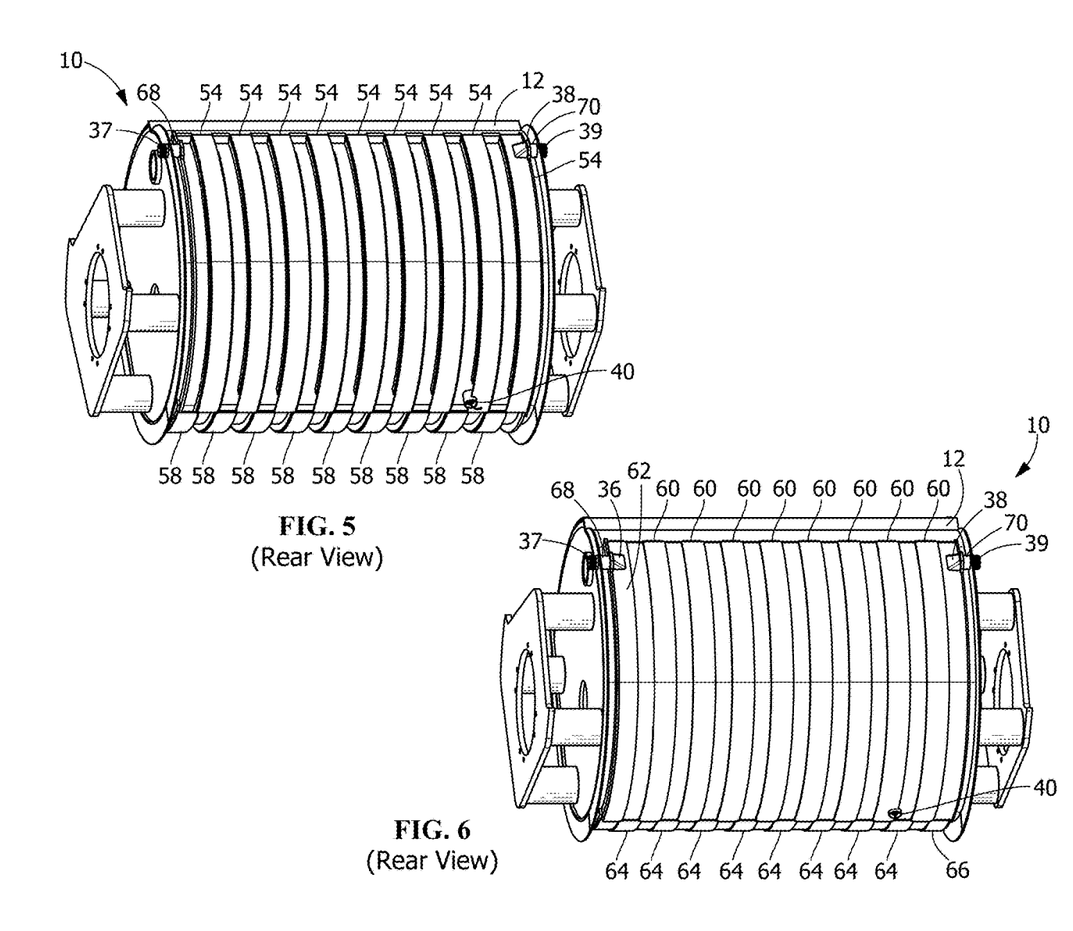
FIG. 5 is a bottom, rear perspective view of the cooling jacket of FIG. 1A, wherein the rear wide covers and front wide covers have been installed on the channels of the cooling jacket.
FIG. 6 is a bottom, rear perspective view of the cooling jacket of FIG. 1A, wherein the rear narrow covers and front narrow covers have been installed on the channels of the cooling jacket.

FIG. 3A provides a bottom, front perspective view of cooling jacket 10, wherein front wide covers 58 and rear wide covers 54 have been installed over front and rear coolant channels 80 and 82 of cooling jacket 10. Also shown in FIG. 3A are dough temperature probe assembly 40; and front right-hand-side cover 56. FIG. 3B is a detail of FIG. 3A more closely showing the positional relationship between front wide covers 58 and one of the rear wide covers 54. FIG. 4A provides a bottom, front perspective view of cooling jacket 10, wherein front narrow covers 64 and rear narrow covers 60 have been installed on front and rear coolant channels 80 and 82, respectively, of cooling jacket 10. FIG. 4B is a detail of FIG. 4A, more closely showing the positional relationship between front wide covers 58; front narrow covers 64; rear wide covers 54, and rear narrow covers 60. FIG. 4C is a detail of FIG. 4A more closely showing the appearance of front right-hand-side cover 56 relative to a front narrow cover 64. FIG. 5 provides a bottom, rear perspective view of cooling jacket 10, wherein rear wide covers 54 (quantity of 8) and front wide covers 58 (quantity of 8) have been installed on rear and front coolant channels 82 and 80, respectively. Also shown in FIG. 5 are coolant outlet 37; inlet cover 38; coolant inlet 39; outlet pipe nipple 68; and inlet pipe nipple 70. FIG. 6 provides a bottom, rear perspective view of cooling jacket 10, wherein rear narrow covers 60 and front narrow covers 64 have been installed on rear and front coolant channels 82 and 80, respectively. Also shown in FIG. 6 are coolant outlet 37; inlet cover 38; coolant inlet 39; dough temperature probe assembly 40; rear narrow right-hand cover 62; outlet pipe nipple 68; and inlet pipe nipple 70.

Figure 7A:
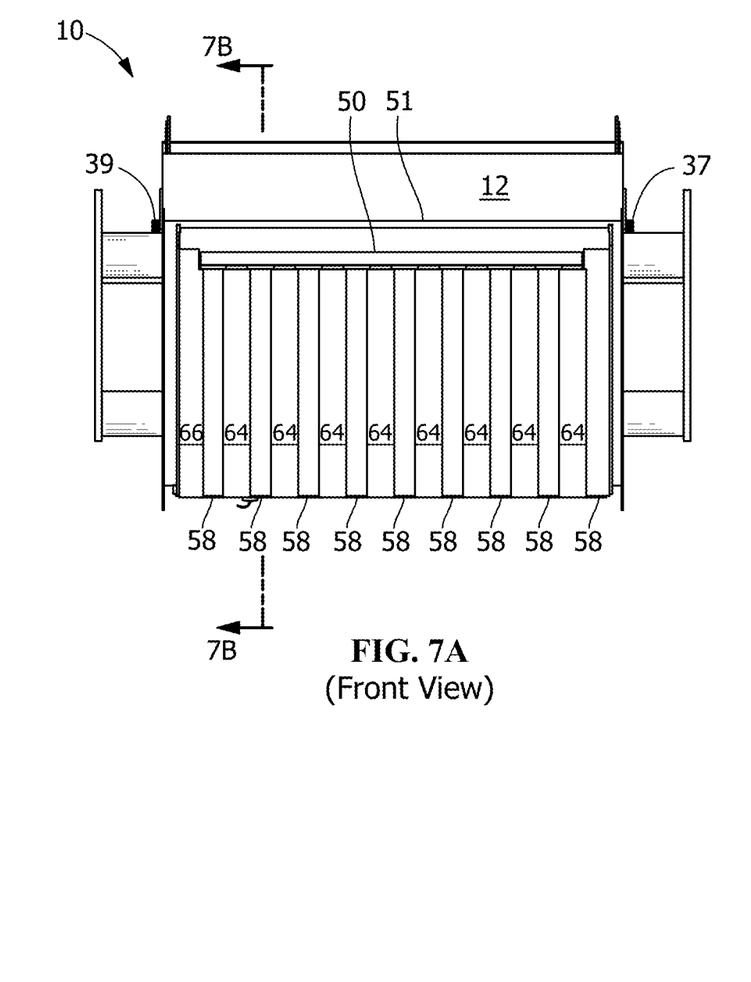
FIG. 7A is a front, side view of the cooling jacket of FIG. 1A, showing the cooling jacket in its fully-assembled state, wherein the front wide covers and front narrow covers have been installed over the cooling channels of the cooling jacket.
Figure 7B:
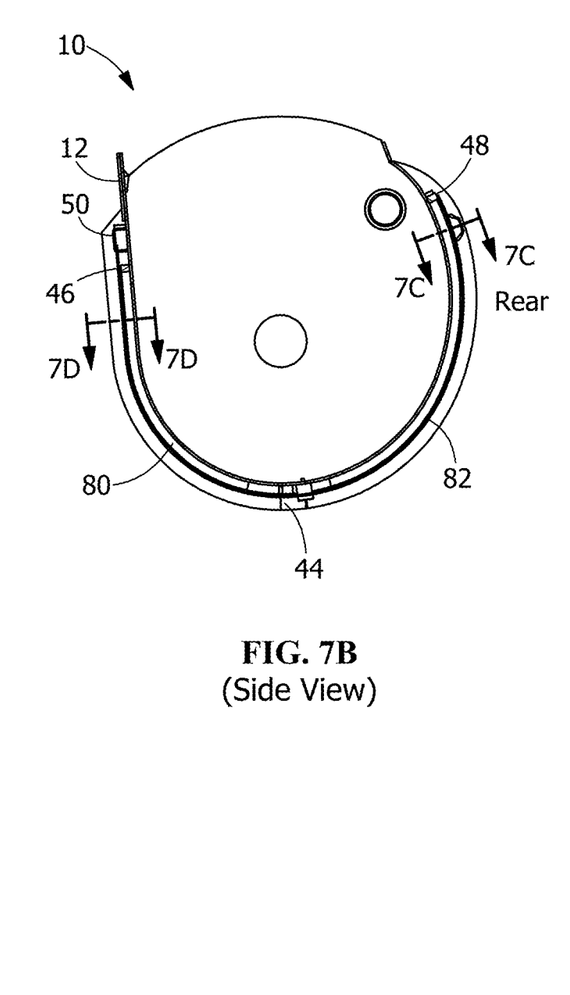
FIG. 7B is a cross-sectional end view of the cooling jacket of FIG. 7A, showing the positions of front coolant channel 80 and rear coolant channel 82.
Figure 7C:
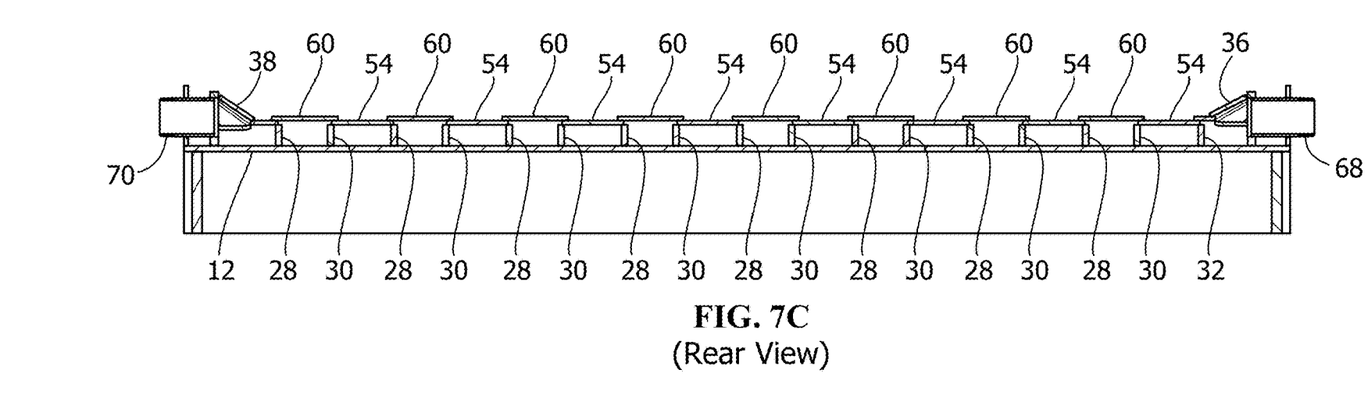
FIG. 7C is a cross-sectional rear view of the cooling jacket of FIG. 7A, showing the positional relationship between the various rear-side rails and channel covers.
Figure 7D:
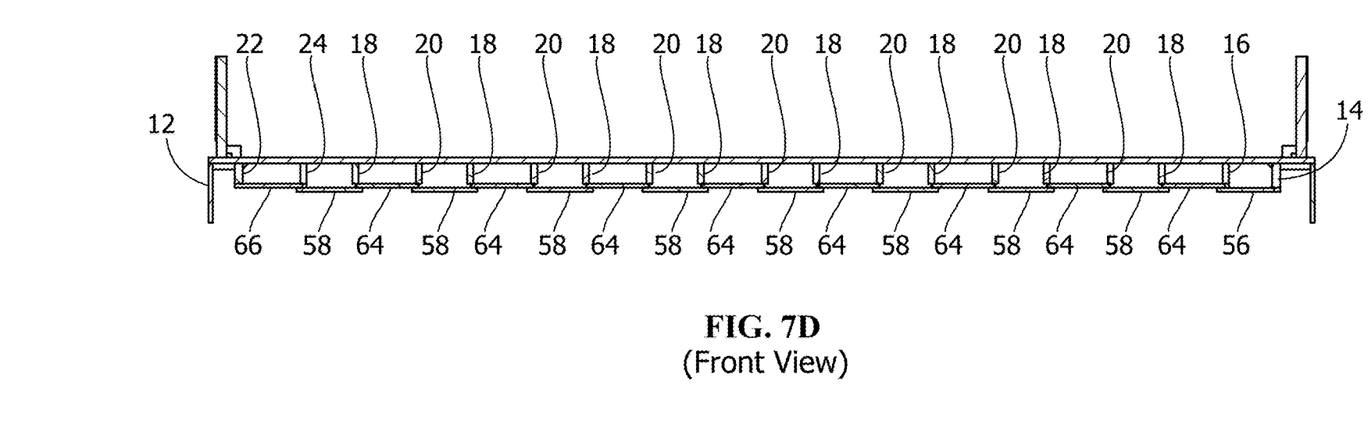
FIG. 7D is a cross-sectional front view of the cooling jacket of FIG. 7A, showing the positional relationship between the various front-side rails and channel covers.

FIG. 7A provides a front, side view of cooling jacket 10, showing the cooling jacket in its fully-assembled state, wherein front wide covers 58 and front narrow covers 64 have been installed over front coolant channels 80. Also shown in FIG. 7A are coolant outlet 37; coolant inlet 39; front cross channel 50, and front cross channel cover 51. FIG. 7B provides a cross-sectional end view of cooling jacket 10, showing the positions of front coolant channel 80 and rear coolant channel 82. Also shown in FIG. 7B are surface of mixing bowl 12; center divider rail 44; front cap rail 46; rear cap rail 48; and front cross channel 50. FIG. 7C provides a cross-sectional rear view of cooling jacket 10, showing the positional relationship between surface of mixing bowl 12; rear bottom return rails 28; rear top return rail 30; rear wide cover 54; and rear narrow covers 60. Also shown in FIG. 7C are rear return rail 32; outlet cover 36; inlet cover 38; outlet pipe nipple 68; and inlet pipe nipple 70. FIG. 7D provides is a cross-sectional front view of cooling jacket 10, showing the positional relationship between surface of mixing bowl 12; front top return rails 18; front bottom return rails 20; front wide covers 58; and front narrow covers 64. Also shown in FIG. 7D are front, right-hand-side rail 14; front, right-hand-side return rail 16; front, left-hand-side rail 22; front left-hand-side return rail 24; front right-hand-side cover 56; and front narrow left-hand-side cover 66.

With regard to the numerous advantageous provided by the cooling jacket of the present invention, in the exemplary embodiment shown in the Figures, coolant channels 80 and 82 run continuously from the front to the rear of the mixing bowl surface 12 or sheet upon which they are mounted. Theses vertically-oriented channels distribute load over a larger area than do prior art cooling jackets, thereby reducing actual stress on the weld joints of the cooling jacket. The result is a 75% reduction in stress experienced by the channel material and a 63% reduction in stress in the cooling jacket weld joints as compared to certain prior art designs such as that discussed above. Also, in the exemplary embodiment shown in the Figures, the actual welds are fillet welds using 90° lap joints. No butt joints are used or included in this design. Each vertical rail is a single piece of metal, resulting in the absence of butt welds from the entire structure of the cooling jacket. The front and rear channel rails are jointed at the bottom of the bowl surface using a lap style joint. The various channel covers are manufactured from a single piece of metal and include lap joints on all edges thereof, which provides for a 90° fillet weld that results in a superior and consistent weld compared to prior art designs, such as that discussed above. With regard to reduced pressure drop throughout the cooling jacket, optimized coolant channel width and height provide an excellent combination of pressure drop and heat transfer, resulting in a 46% reduction in pressure drop through the cooling jacket.

The assembly of the cooling jacket of this invention is typically accomplished in a series of discrete steps, which allows for easy inspection of the cooling jacket assembly process, as it occurs for each major step in the process. Channel notches, channel welds, and cover welds can all be thoroughly inspected as the assembly of the cooling jacket progresses. The divided design (i.e., separate front and rear coolant channels) creates a cooling jacket that is essentially two distinct or largely independent cooling jackets having a significantly increased surface area as compared to prior art designs. As shown in the Figures, the coolant channels are split at the bottom of the mixing bowl surface (bowl sheet), for creating additional flow direction changes (i.e., turns) for the liquid coolant. Each turn on the surface of the mixing bowl creates additional turbulence in the liquid coolant, thereby increasing heat transfer throughout the entire bowl sheet. Locating these turns across the bottom of the mixing bowl surface places more channel turns in direct contact with the dough than does the location of similar turns in prior art designs.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. A cooling jacket for use with an industrial mixer, wherein the industrial mixer includes a bowl sheet as a component thereof, wherein the bowl sheet includes an internal surface that defines a cavity for receiving material to be mixed and an external surface having a front section and a rear section, wherein the front section further includes a top portion and a bottom portion, and wherein the rear section further includes a top portion and a bottom portion, the cooling jacket comprising:
   (a) a first horizontal rail mounted lengthwise across the top portion of the rear section of the bowl sheet;
   (b) a second horizontal rail mounted lengthwise across the top portion of the front section of the bowl sheet;
   (c) a plurality of vertical rails mounted on the rear section of the bowl sheet in a staggered pattern;
   (d) a plurality of vertical rails mounted on the front section of the bowl sheet in a staggered pattern;
   (e) a plurality of horizontal rails mounted across the bottom portions of the rear and front sections of the bowl sheet, wherein each rail in the plurality of horizontal rails is mounted between and perpendicular to certain of the vertical rails mounted on the rear section of the bowl sheet and certain of the vertical rails mounted on the front section of the bowl sheet, (i) wherein the first and second horizontal rails, vertical rails, and horizontal rails mounted between certain of the vertical rails define a first coolant channel on the rear section of the bowl sheet and a second coolant channel of the front surface of the bowl sheet;

(f) a first plurality of channel covers mounted to the vertical rails on the rear section of the bowl sheet and a second plurality of channel covers mounted between and to the channel covers in the first plurality of channel covers, wherein the first and second plurality of channel covers are operative to completely enclose the first coolant channel;

(g) a third plurality of channel covers mounted to the vertical rails on the front section of the bowl sheet and a fourth plurality of channel covers mounted between and to the channel covers in the third plurality of channel covers, wherein the third and fourth plurality of channel covers are operative to completely enclose the second coolant channel; and (h) a horizontal cross-channel formed on the front section of the bowl sheet above the second horizontal rail, wherein the cross-channel is operative to permit fluid coolant to flow from one side of the cooling jacket to the other side of the cooling jacket on the front section of the mixing bowl.

2. The cooling jacket of claim 1, further comprising a fluid inlet, wherein the fluid inlet is operative to introduce fluid coolant into the cooling jacket; and a fluid outlet, wherein the fluid outlet is operative to allow fluid coolant to exit the cooling jacket.

3. The cooling jacket of claim 1, wherein the first coolant channel is in fluid communication with the second coolant channel for permitting fluid coolant on the rear section of the bowl sheet to cross from the rear section of the bowl sheet to the front section of the bowl sheet.

4. The cooling jacket of claim 1, wherein the cooling jacket is constructed from metal components that have been welded together, and wherein the welds between the components are lap welds.

5. The cooling jacket of claim 1, wherein the cooling jacket is adapted for use with either an indirect refrigeration system or a direct refrigeration system.

6. A cooling jacket for use with an industrial mixer, wherein the industrial mixer includes a bowl sheet as a component thereof, wherein the bowl sheet includes an internal surface that defines a cavity for receiving material to be mixed and an external surface having a front section and a rear section, wherein the front section further includes a top portion and a bottom portion, and wherein the rear section further includes a top portion and a bottom portion, the cooling jacket comprising:

(a) a first horizontal rail mounted lengthwise across the top portion of the rear section of the bowl sheet;

(b) a second horizontal rail mounted lengthwise across the top portion of the front section of the bowl sheet;

(c) a plurality of vertical rails mounted on the rear section of the bowl sheet in a staggered pattern;

(d) a plurality of vertical rails mounted on the front section of the bowl sheet in a staggered pattern;

(e) a plurality of horizontal rails mounted across the bottom portions of the rear and front sections of the bowl sheet, wherein each rail in the plurality of horizontal rails is mounted between and perpendicular to certain of the vertical rails mounted on the rear section of the bowl sheet and certain of the vertical rails mounted on the front section of the bowl sheet, (i) wherein the first and second horizontal rails, vertical rails, and horizontal rails mounted between certain of the vertical rails define a first coolant channel on the rear section of the bowl sheet and a second coolant channel of the front surface of the bowl sheet;

(f) a first plurality of channel covers mounted to the vertical rails on the rear section of the bowl sheet and a second plurality of channel covers mounted between and to the channel covers in the first plurality of channel covers, wherein the first and second plurality of channel covers are operative to completely enclose the first coolant channel; and (g) a third plurality of channel covers mounted to the vertical rails on the front section of the bowl sheet and a fourth plurality of channel covers mounted between and to the channel covers in the third plurality of channel covers, wherein the third and fourth plurality of channel covers are operative to completely enclose the second coolant channel.

7. The cooling jacket of claim 6, further comprising a fluid inlet, wherein the fluid inlet is operative to introduce fluid coolant into the cooling jacket; and a fluid outlet, wherein the fluid outlet is operative to allow fluid coolant to exit the cooling jacket.

8. The cooling jacket of claim 6, wherein the first coolant channel is in fluid communication with the second coolant channel for permitting fluid coolant on the rear section of the bowl sheet to cross from the rear section of the bowl sheet to the front section of the bowl sheet.

9. The cooling jacket of claim 6, wherein the cooling jacket is constructed from metal components that have been welded together, and wherein the welds between the components are lap welds.

10. The cooling jacket of claim 6, wherein the cooling jacket is adapted for use with either an indirect refrigeration system or a direct refrigeration system.

* * * * *